United States Patent [19]

Schuller et al.

[11] 3,871,891

[45] Mar. 18, 1975

[54] METHOD FOR THE PRODUCTION OF HIGHLY WEAR-RESISTANT CERAMIC MATERIAL

[75] Inventors: Karl-Heinz Schuller; Horst Nink, both of Lauf/Pegnitz, Germany

[73] Assignee: Rosenthal Stemag Technische Keramik AG, Selb, Germany

[22] Filed: Dec. 14, 1973

[21] Appl. No.: 424,749

[30] Foreign Application Priority Data
Mar. 23, 1973 Germany............................ 2314442

[52] U.S. Cl...................... 106/65, 106/73.4, 51/309
[51] Int. Cl............................................ C04b 35/10
[58] Field of Search.......... 106/56, 65, 73.4; 51/309

[56] References Cited
UNITED STATES PATENTS
2,538,959   1/1951   Ballard................................. 106/65
2,618,567   11/1952   Comstock............................. 106/65
3,093,498   6/1963   Whittemore et al.................. 106/65
3,226,456   12/1965   Ryshkewitch et al................. 106/65
3,637,406   1/1972   Bailey................................... 106/73.4

Primary Examiner—J. Poer
Attorney, Agent, or Firm—Ostrolenk, Faber, Gerb & Soffen

[57] ABSTRACT

A new method for the production of extremely wear-resistant aluminum oxide ceramic material, particularly $Al_2O_3$, in which at least 98% $Al_2O_3$ powder is mixed with 10–50 pph carbonaceous plasticizer, optionally pressed into a blank, heated to 1,280°–1,500° C., sintered for at least 5 minutes at the highest temperature, and then cooled is described.

7 Claims, 1 Drawing Figure

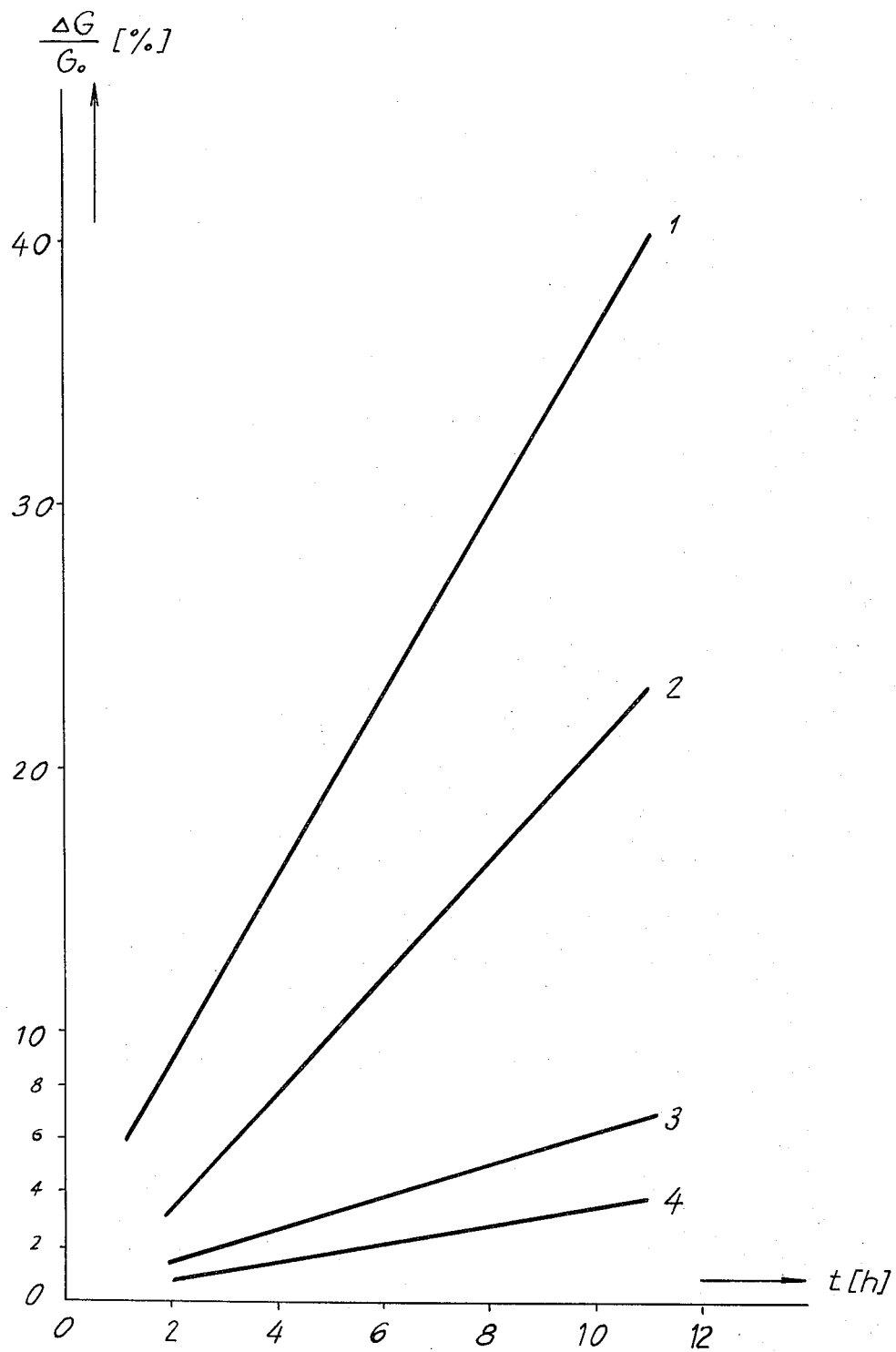

METHOD FOR THE PRODUCTION OF HIGHLY WEAR-RESISTANT CERAMIC MATERIAL

The invention concerns a new method for the production of extremely wear-resistant aluminum oxide material, particularly $Al_2O_3$.

By addition of a small amount of alkaline earth oxides, for example, to batches of practically pure $Al_2O_3$, good wear-resistant materials have previously been obtained by conventional sintering. When these materials are tested mechanically for abrasion (DELTA G/G), values per hour represented by curve 2 in the attached drawing are obtained. (Explained further below; curve 3 is the optimum reference curve.)

Furthermore, it is known(DAS 2,164,301 by Nippon Ltd.) how to produce wear-resistant ceramic materials with an $Al_2O_3$ content of up to 80 percent by weight. These materials, however, contain rather substantial amounts of SiC and of a glass phase, and "wear" is not caused by mechanical stress but by the corrosive influence of adjacent molten materials, e.g., in the use as melting furnace material. Additionally, the as-finished sintered materials are contaminated with undesired material since tar, pitch and the like were used as binders.

Compared to this known state-of-the art, the invention produces well defined materials with a high $Al_2O_3$ content, and a high degree of purity which are characterized by a greatly reduced material loss (DELTA G/G) per hour under mechanical surface stress. With this "wear-resistance" is combined or automatically linked other valuable properties of the materials according to the invention: fine and uniform grain, great hardness practically theoretical density and high surface quality.

The invention uses the well known hot-pressing method, in which a mixture of at least 98% $Al_2O_3$ powder of commercial grade and of a carbon-containing plasticizer, solvent or diluent, whose premature evaporation is prevented, is introduced into a normal hot press. This method is characterized by the succession of the following operating steps:

a. Mixing 100 parts by weight of at least 98% $Al_2O_3$ powder of commercial fineness with 10–50 parts by weight of a carbonaceous plasticizer, solvent and the like;

b. optionally, pressing a blank;

c. heating the mixture in a hot press to a temperature range between 1,280° and 1,500° C. and pressing with a holding time of at least 5 minutes at the highest temperature; and d. cooling. If desired, step (b) can be omitted.

The carbonaceous agent is preferably a polyvinyl alcohol (PVA) dissolved in an inert solvent.

After step (a), the slightly dried mixture can be passed through a screen to separate lumps or to reduce them in the screen.

Instead of applying surface pressure as is generally customary, i.e., in the cold state, it is possible to apply the pressure only when the appropriate maximum temperature has been attained.

The heating rate should not be below about 50° C./min. to prevent premature evaporation of the organic agent mentioned in step (a).

The $Al_2O_3$ powder can also be 100 percent pure.

The finished pieces are generally cut out and/or the surface reworked on. The following procedure is used to determine the surface quality mentioned below:

Pregrinding with SiC powder until visible unevenness has disappeared; regrinding with SiC paper 320 for 45 minutes;

Regrinding with SiC paper 600 for 45 minutes. Then, surface quality is determined by means of a Perthometer, model WVR, by Perthan Hannover.

EXAMPLE 1

100 g fine $Al_2O_3$ powder a commercial, highly reactive type 98 percent) were thoroughly mixed in a mortar with a 10 percent PVA in dist. water solution, dried for 15 minutes in a cabinet and then passed through a DIN 4188 screen (0.5 mm mesh aperture). The fine material was pressed into cylindrical rods of 9.8 mm diameter and 24 mm length. A pressure of 350 kg/cm² was placed on the prepressed body before heating in the hot press (induction heating with graphite matrices). The hot press plus the prepressed body was then heated to 1,280°C. at a rate of 150° C./min. This temperature was maintained for 5 minutes, after which the pieces were cooled for 25 minutes in the press. After final cooling in ambient air, the body was ground and reworked to determine the surface quality, as indicated above.

Technical data of the finished bodies:

| | |
|---|---|
| color | black |
| density | 3.93 g/cc |
| hardness (Rockwell HRC 45) | 91 |
| grain size | 1 to $2\mu$, very regular |
| surface quality | $Rt = 0.6\ \mu$, $Ra = 0.06\ \mu$ |
| abrasion resistance | see drawing, curve 4 |

Curves 1 to 4 were recorded with a centrifugal scouring unit by Jansen. Compared to the optimum reference curve 3, we see a reduction of the abrasion by about 40 percent. Curve 3 was measured likewise on hot-pressed Al2O3 pieces of 100 percent purity whose binder had first been burnt off by heating.

Curves 1 to 4 are related as follows:

1. 100% $Al_2O_3$ produced in the normal sintering process.

2. 99.5% $Al_2O_3$ with addition of alkaline earth oxides to reduce abrasion, likewise produced in the normal abrasion process.

3. 100% $Al_2O_3$, hot-pressed, but binder first expelled by heating.

4. practically 100% $Al_2O_3$ according to the invention.

The other properties of the test pieces represented by curve 3 are: white color, density and hardness identical with the pieces according to the invention, grain size 2 to 3 $\mu$, surface quality with $Rt = 1\ \mu$ and $Ra = 0.1\ \mu$.

We have reached the following working hypothesis, which has not been fully verified, but which leaves the inventive content of the new method unaffected. From the carbonaceous mixture component is separated a finely distributed, possibly atomic, carbon if the conditions of the procedure according to the invention are maintained. It gives the black coloration, and as an inhibitor of grain size growth, it is a direct cause of the great regularity and fineness in the grain size. This results secondarily in a high surface quality, primarily and secondarily in the unusually high abrasion resistance.

From this working hypothesis the opposite can be concluded: Namely, the simultaneous presence of high surface quality and very great mechanical abrasion resistance of a dense ceramic body suggests a great uniformity and fineness of the grain size picture of the body.

EXAMPLE 2

The starting mixture consisted of 100 g $Al_2O_3$, quality as in Example 1, and 15 g 10 percent PVA dist. water solution. The test pieces were produced as in Example 1, but the pressure was increased to 400 kg/cm². The maximum temperature was increased to 1,400° C. Properties of this test piece:

| | |
|---|---|
| color | black |
| density | 3.95 g/cc |
| hardness (Rockwell HRC 45) | 91 |
| grain size | ca. 1 $\mu$, very regular |
| surface quality | as in Example 1 |
| abrasion resistance | see drawing, curve 4 |

EXAMPLE 3

The mixture consisted of 100 g of the $Al_2O_3$ powder and 20 g PVA dist. water solution. The test pieces were produced as in Example 1 with the following changes:

| | |
|---|---|
| pressure | 450 kg/cm² |
| maximum temperature | 1450°C. |
| holding time at this temperature | 10 min. |
| cooling time in the press | 30 min. |

Properties of the resulting test pieces:

| | |
|---|---|
| color | black |
| density | 3.95 g/cc |
| hardness (Rockwell HRC 45) | 93 |
| grain size | ca. 1 $\mu$, very regular |
| surface quality | as in Example 1 |
| abrasion resistance | see drawing, curve 4 |

EXAMPLE 4

Example 2 was repeated except that the maximum pressure of 400 kg/cm was applied on the test pieces only when the maximum temperature (1,350° C.) had been approximately attained. The holding time at this temperature was 10 minutes, and the cooling time in the press was 25 minutes.

Properties of the resulting test pieces:

| | |
|---|---|
| color | black |
| density | 3.96 g/cc |
| hardness (Rockwell HRC 45) | 91 |
| grain size | ca. 1 $\mu$, very regular |
| surface quality | as in Example 1 |
| abrasion resistance | see drawing, curve 4 |

EXAMPLE 5

The mixture consisted of 100 g of the same $Al_2O_3$ powder and 50 g PVA in dist. water solution. The application of 400 kg/cm² pressure began with the start of heating (rate 100° C./min.). The maximum temperature of 1,450° C. was maintained for 5 minutes.

Properties of the resulting test pieces:

| | |
|---|---|
| color | black |
| density | 3.94 g/cc |
| hardness (Rockwell HRC 45) | 91 |
| grain size | ca. 1 $\mu$, very regular |
| surface quality | as in Example 1 |
| abrasion resistance | see drawing, curve 4 |

COMPARATIVE EXAMPLE

In order to demonstrate that the lower limit of the heating rate of 50° C./min. represents a critical limit, Example 4 was repeated using a heating rate of 45° C./min. The properties of the resulting test pieces were:

| | |
|---|---|
| color | dark gray |
| density | 3.95 g/cc |
| hardness (Rockwell HRC 45) | 90 |
| grain size | 2 $\mu$ |
| abrasion resistance | see drawing, reference curve 3 |

Material produced according to the invention are highly suitable for all uses where a very low abrasion resistance is important and where the above mentioned degrees of hardness, the high surface quality and/or the high density are additionally desirable properties: cutting tools for machining, drawing dies, thread and wire guides, grinding aids, particularly for material which reacts sensitively to foreign particles.

The technical advance of the present invention, in addition to the above mentioned obtainable good properties of the ceramic bodies, lies also in the fact that the heating of the binder or plasticizer, which was necessary heretofore to obtain dense sintered bodies, is eliminated as a separate step.

We claim:
1. Method for the production of highly wear-resistant bodies of $Al_2O_3$ ceramic material, characterized by the succession of the following operating steps:
   a. preparing a mixture consisting of 100 parts by weight of at least 98% pure $Al_2O_3$ and 10 to 50 parts by weight of a carbonaceous plasticizer;
   b. heating the mixture in a hot press at a rate of at least 50° C./minute to a temperature between 1,280° and 1,500° C. and pressure sintering with a holding time of at least 5 minutes at a maximum temperature; and
   c. cooling the mixture.
2. Method according to claim 1 wherein polyvinyl alcohol is the carbonaceous plasticizer.
3. Method according to claim 1 wherein 100% $Al_2O_3$ powder is used.
4. Method according to claim 1 wherein the mixture of step (a) is pressed into a blank.
5. Method according to claim 4 wherein the pressure is applied before the maximum temperature has been attained.
6. Method according to claim 4 wherein the pressure is applied when about the maximum temperature has been attained.
7. Dense, ceramic aluminum oxide body, produced according to claim 1.

* * * * *